(No Model.)
W. M. TURNER.
MILK COOLER.
No. 244,002. Patented July 5, 1881.
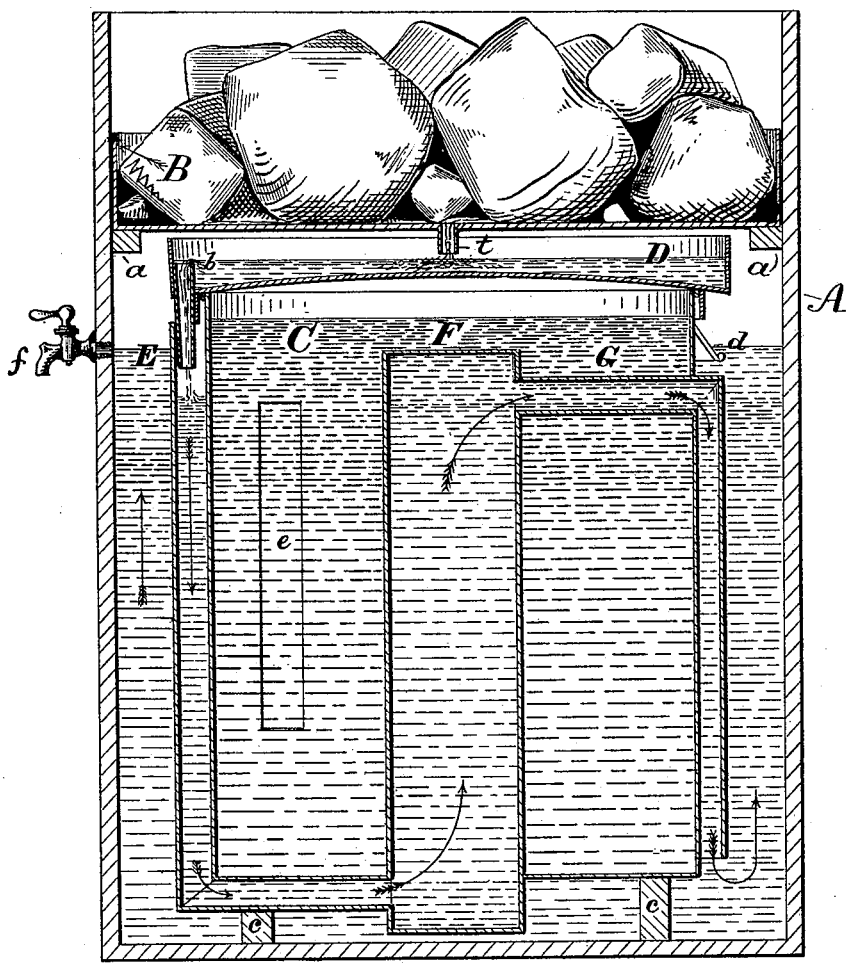
WITNESSES:
Thos. Houghton.
Edw. W. Byrn.
INVENTOR:
Wm M. Turner
BY
ATTORNEYS.

UNITED STATES PATENT OFFICE.

WILLIAM M. TURNER, OF ALBIA, IOWA.

MILK-COOLER.

SPECIFICATION forming part of Letters Patent No. 244,002, dated July 5, 1881.

Application filed May 10, 1881. (No model.)

*To all whom it may concern:*

Be it known that I, WILLIAM MINTURN TURNER, of Albia, in the county of Monroe and State of Iowa, have invented a new and useful Improvement in Milk-Coolers; and I do hereby declare that the following is a full, clear, and exact description of the same, reference being had to the accompanying drawing, forming part of this specification, in which the figure is a vertical central section.

My invention relates to an improved milk-cooler designed to raise cream on the milk on the cream-gathering plan, so as to allow the farmers to set their own milk to be skimmed by the manufacturers of butter.

My invention consists in a can having an upper and lower flanged cover and three vertical tubes, one of which leads from the tray formed by the flange on the top side of the cover, and conveys the cold water to the middle tube, which is larger, and which rises in the center of the can to nearly the top of the same, and from the top of which the water passes into another tube on the opposite side from the first, to the bottom of the can, at which point the water emerges and surrounds the whole body of the can to height of milk, and passes off through an overflow-orifice in a surrounding tank, in which the can is partially submerged, by which means a positive circulation and thorough cooling effect is produced.

In the drawing, A represents a tank for containing one or more cans, which tank is made of wood or other suitable material in any substantial manner, and has cleats or seats *a* near its upper edge, upon which rests a pan, B, which receives the water and ice for regulating the temperature of the milk. These tanks may be arranged in sets or sections, and in each is contained one or more milk-cans, C, of a capacity to suit the requirements of the former. These cans are provided with upper and lower flanged covers D, onto the top of which the cold water passes through outlet *t* from the pan B at the top of the tank, and from which flanged cover the water passes by an outlet-pipe, *b*, into the tube E. This tube is fixed upon the outer periphery of the can, and at its lower end it turns under the can, and communicates with the bottom of a large tube, F, rising centrally in the can to nearly the surface of the milk. The latter tube is closed at its upper and lower ends, and from its upper end there extends a pipe, G, which passes down the outside of the can and opens near the bottom of the same into the space between the outside of the can and the inside of the tank. The can is also provided with feet *c*, upon which it stands, and has ears *d*, by which it may be lifted from place to place, while a glass gage, *e*, permits the line of the milk and cream to be determined.

The can being in position in the tank, cold water is allowed to flow from its pan B down upon the cover D of the can, whence it passes down tube E and up through tube F, cooling the central portions of the milk, and then passing down tube G, it rises on the outside of the can and flows off at an overflow-orifice, *f*, in the tank. I thus secure a constant circulation of water over the top, through and around the milk, which secures a more rapid cooling and enables me to maintain a more even temperature than where the cans are simply immersed in a still body of water.

This device, though principally designed for cooling the milk in summer, may also be used for warming it in winter, to maintain an even temperature of 60°.

Having thus described my invention, what I claim is—

1. The improved milk-can herein described, consisting of a body portion with upper and lower flanged cover D, having outlet-pipe *b*, and the three tubes E F G, the tube F rising in the center of the can, and being connected with the tube E at the bottom and the tube G at the top, substantially as and for the purpose described.

2. The can C, having the three tubes E F G, one of which, F, rises in the center of the can and connects with E at the bottom and G at the top, in combination with the upper and lower flanged cover D, having an outlet, *b*, adapted to register with the upper end of tube E, and the tank A, having pan B, with outlet *t*, and an overflow, *f*, substantially as and for the purpose described.

WILLIAM MINTURN TURNER.

Witnesses:
F. W. NUTTING,
H. W. WATSON.